UNITED STATES PATENT OFFICE.

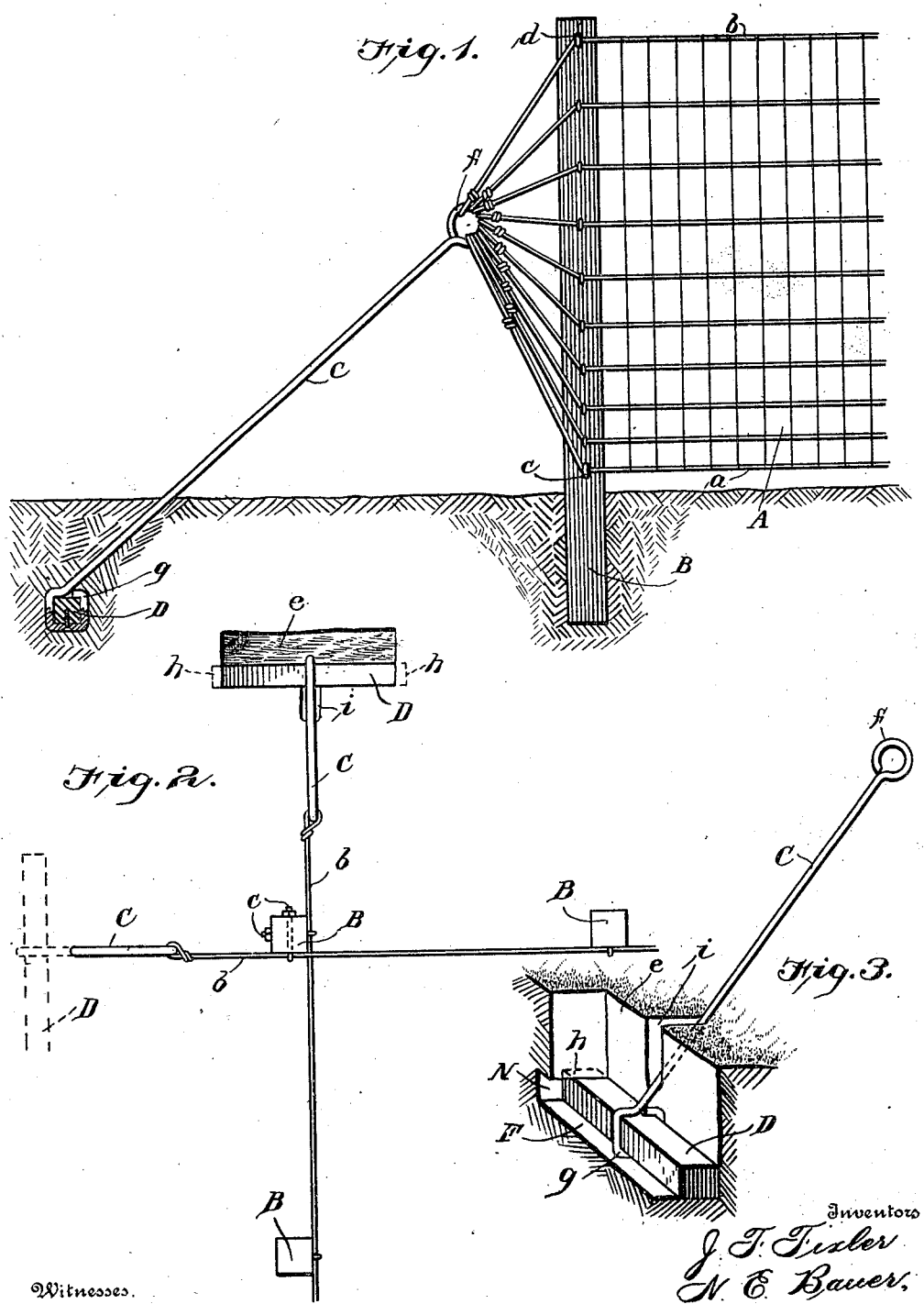

JOHN F. FIXLER AND NICHOLAS E. BAUER, OF HELENA, OHIO.

ANCHOR FOR FENCE-POSTS AND THE LIKE.

No. 837,618.  Specification of Letters Patent.  Patented Dec. 4, 1906.

Application filed August 16, 1905. Serial No. 274,458.

*To all whom it may concern:*

Be it known that we, JOHN F. FIXLER and NICHOLAS E. BAUER, citizens of the United States, residing at Helena, in the county of Sandusky and State of Ohio, have invented certain new and useful Improvements in Anchors for Fence-Posts and the Like; and we do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to land or ground anchors for fences, fence-posts, or other like constructions.

It has for its object to hold and retain a fence or other post securely in position.

Heretofore fence-posts have been planted in the ground and the earth tamped or rammed down about them and when so tamped will remain tight and vertical for a certain period or time; but when it is in the frozen ground and a thaw takes place or when continuous rain takes place the earth softens and the post becomes loose and falls to one side, gives way, and the wire fence falls over and becomes inoperative to turn cattle and also becomes useless for other purposes of inclosure. With our invention all these objections are overcome.

Our invention consists in combining an anchor-iron with a leader or tie-rod and placing the same securely against solid earth in such manner that by pulling hard upon the anchor and tie-rod or leader the anchor becomes solidly fixed; second, the anchor-iron and tie-rod are so arranged that one end of the tie-rod is secured around the anchor-iron by an eye or the tie-rod is placed around the iron and then twisted around itself. The anchor is then placed in the body of the earth in an excavation previously prepared for it. The fore end is also provided with a suitable eye, formed by turning the end of the rod upon itself or in any suitable manner, in which the ends of the fence-wire may be secured.

The invention further consists in the combination of the anchor and tie-rod by placing them in the earth, first digging an opening in the earth—for practical purposes, say, three feet long and about eighteen inches wide and thirty inches deep. At the bottom of this opening we dig a small space at each end—say about six inches long and as wide as the end of the anchor-iron—both end spaces being on the same plane as the bottom of the main opening and extending endwise therefrom for the reception of the end of the anchor-iron.

To carry out our invention the anchor is firmly planted in the ground, the post is planted, and the wires are secured to the tie-rod, as shown, and the wires are then stretched, so as to evenly distribute the strain throughout the whole fence. Of course the posts may be placed at any desired distance apart to suit any requirement. It is obvious that our anchor-iron and tie-rod may be applied to any kind of wire fencing now manufactured. The eye and the tie-rod are so located that when the wires are attached and stretched all the wires still have as nearly as possible equal strain, the upper wires pulling against the lower wires, and vice versa, and then the strain on the tie-rod is equal.

In the drawings, Figure 1 is a side elevation of a portion of a wire fence, illustrating our invention in an operative position. Fig. 2 shows details of the manner of crossing fence-lines and securing them together. Fig. 3 shows in perspective the opening in the earth and our improved anchor placed therein.

The same letters of reference will indicate like parts throughout the figures, in which—

A is a section of a fence of ordinary wire.

B is a post of the ordinary kind, the upper and lower wires $a$ and $b$ being secured to the post by eyebolts $c$ and $d$ and the other wires are secured by ordinary staples. Eyebolts for the top and bottom wires are used, for the reason that the greatest strain is on those wires when all the fence-wires are stretched.

C is the tie-rod, provided with an eye $f$, to which are secured all the wires forming the fence, its other end being turned into a rectangular eye or fastening $g$, conforming to and fastened around the anchor-iron.

D is the anchor-iron, which is laid in the opening $e$ on the bottom thereof, the ends extending into spaces $h$ made at the ends of the bottom opening, a slot or space $i$ being cut in the side of the opening on an incline to permit the tie-rod to lie in that position.

Before we place the anchor-iron and tie-rod in position a hole or opening is dug in the earth, as above mentioned. The anchor-iron is then placed in said opening, one end of the anchor-iron being pushed into the space at the end of the opening, while the other end is let into a slot formed at the other end of the opening. By this it will be seen that the anchor-iron is about six inches longer than the opening proper. The object of making it longer is that when great strain is put upon the tie-rod the anchor ends come against solid undug earth, which will hold the anchor-iron better than the earth that has been removed and put back. Furthermore, the ends hold the anchor-iron hard up against the solid sides of the opening, and thus when the wires are stretched the tie-rod pulls on the anchor-iron and the anchor-iron against the solid sides of the opening, and danger of pulling it out of the ground is entirely obviated and overcome. It will be further seen that the anchor-iron anchored in this way is durable, reliable, simple, and cheap in first cost, as the anchor may be planted in the ground whenever a wire fence is needed. As seen by Fig. 2, when fence-wires are to be crossed one post is sufficient to carry both wires; but eyebolts, such as shown by c, should be used. It will be observed that the inclination of the tie-rod puts the strain entirely on the anchor-iron and the anchor-iron in turn against the side of the solid earth, and thus when a great pull is made upon the wires the anchor-iron renders the posts secure in their straight and vertical position and permanently retains them in that position.

It is known that attempts have been made to anchor fence-posts; but none that we are aware of are satisfactory. We do not, therefore, wish to confine ourselves to the exact form shown and described, as modifications can be made within wide scope thereof without departing from the spirit of our invention.

Having thus described our invention and the best means of carrying the same into effect, what we claim as new, and desire to secure by Letters Patent, is—

The combination with a fence-post and wires thereon, of an anchor arranged to be planted in the ground, a tie-rod secured to said anchor and provided with an eye at its upper end to which the said wires are connected, the said eye on said tie-rod being at a distance from the ground which is at or near the mid-height of said post and intermediate the top and bottom wires of the fence, whereby the upper wires exert an upward strain on the tie-rod and the lower wires exert a downward strain on the tie-rod, substantially as described.

In testimony whereof we affix our signatures in presence of two witnesses.

JOHN F. FIXLER.
NICHOLAS E. BAUER.

Witnesses:
  RAY V. GARN,
  PETER BAUER.